United States Patent [19]
Takeuchi et al.

[11] Patent Number: 4,547,372
[45] Date of Patent: Oct. 15, 1985

[54] METHOD FOR MAKING SAKÉ

[75] Inventors: Itsuo Takeuchi, Kashiwa; Teruaki Yokoshima, Iwai; Noboru Tabata, Wakayama; Eishin Fujita, Akashi; Koshiro Nagata, Kobe; Tetsuya Kishimoto, Noda, all of Japan

[73] Assignee: Kikkoman Corporation; Nada-Gogo Sake Brewers, Common Facility Cooperation, both of Japan.

[21] Appl. No.: 554,349

[22] Filed: Nov. 22, 1983

[30] Foreign Application Priority Data

Nov. 25, 1982 [JP] Japan ................. 57-205472

[51] Int. Cl.$^4$ ............................................. C12G 3/02
[52] U.S. Cl. ...................................... 426/11; 426/592
[58] Field of Search ............... 426/618, 625, 445, 447, 426/448, 449, 450, 592, 11

[56] References Cited

U.S. PATENT DOCUMENTS 3,650,763 3/1972 Touba ................................. 426/625
3,661,071 5/1972 Toei et al. .......................... 426/447
3,754,930 8/1973 Toei et al. .......................... 426/447
3,833,748 9/1974 Tsuchiya ........................... 426/447

FOREIGN PATENT DOCUMENTS 1958866 11/1966 Japan .
1879182 4/1982 Japan .

Primary Examiner—Raymond Jones
Assistant Examiner—Marianne M. Cintins
Attorney, Agent, or Firm—Banner, Birch, McKie & Beckett

[57] ABSTRACT

A method for the quality improvement of low-quality rice for saké brewing is disclosed wherein a low-quality rice such as low-grade rice, undermilled rice or old rice is heated at a pressure of 3.0 kg/cm$^2$ or above and a temperature of 185° C. or above for one minute or less, preferably 2 to 10 seconds, and quickly discharged into an atmosphere of ambient pressure to obtain a puffed rice utilized as a starting material for saké brewing.

2 Claims, No Drawings

METHOD FOR BREWING SAKE

This invention relates to a method for the quality improvement of low-quality rice for saké brewing. More particularly, it relates to a method for the quality improvement of low-quality rice for saké brewing by expanding (puffing) the low-quality rice so that when used in saké brewing, the rice may show reduced elution of amino acids and enhanced dissolution of starch.

The qualitites generally required for the rice for saké brewing are well-filled kernels of large and uniform size, a low checked kernel content, a low protein content, a high rate of soaking, the development of resilience upon steaming, a high rate of mycelial growth of koji mold within the kernel, and a high susceptibility to saccharification. The rice which meets such requirementes is called suitable rice for saké brewing and is differentiated from other varieties of rice. In fact, when saké is brewed from such a suitable rice variety, the brewing process is easily controlled, the percentage recovery of saké cake is low, and a high-quality saké is produced. As contrasted, low-quality rice, undermilled rice (including the white rice for staple food), and old rice (rice stored for at least one year after havested) are unsuitable for saké brewing and are scarcely used. The low-quality rice, as herein referred to, includes low-grade rice, broken rice, and hard rice of small kernel size. Because of smallness and nonuniformity in size or of hard kernels, the low-quality rice still retains the defects after preparatory treatments such as soaking, draining, and steaming. The undermilled rice of about 77–78% or higher in milling ratio [(kg milled rice (white rice)/kg unmilled rice (brown rice))×100], which is higher than that, 73–75%, of rice usually used in saké brewings, is not suitable because of a high rate of elution of amino acids during the brewing [common white rice for staple food (milling ratio, 91–92%) is classified as undermilled rice in this sense]. The old rice having a hardened texture has not been used in saké brewing, because potassium, phosphorus, and crude fat existed in the surface laeyer of original kernel have migrated as far as the kernel core and are difficult to remove by milling; and because it contains a precursor of dimethyl sulfide (DMS) which is the cause of "the odor characteristic of old rice" (an unpleasant odor defined in saké brewing) and imparts the same odor to saké.

There is known a method for converting old rice to a material usable in brewing by soaking, draining, heating under applied pressure (at 120° C. or above and 1 to 3 kg/cm$^2$), and quickly releasing the pressure to remove a DMS precursor from the old rice (Japanese Patent Publication No. 18,791/82). In another known process for converting common brewing rice to an easily dissolvable material, the untreated rice is heated under application of pressure (at 140° to 180° C. and 5 to 10 kg/cm$^2$), and subjected to pressure-releasing treatment to produce expanded rice (Japanese Patent Publication No. 19,588/66). These methods, indeed, renders it possible to remove the DMS precursor and to improve the rate of dissolution by heating the rice under applied pressure and quickly releasing the pressure to effect expansion of the rice in a short period of time. However, upon detailed analysis of the saké made from the rice treated by heating under pressure followed by quick release of the pressure, it was found that a significant amount of amino acids was eluted into the saké and changed into fusel oil or the like which imparts unpleasing taste to the saké. The present inventors conducted an extensive study about the conventional processes to find precise conditions for the production of expanded rice from the low-quality rice, which can be used in brewing saké of good quality. The present invention is predicated upon the finding that the temperature of heating under applied pressure is an important factor and that the elution of amino acids during brewing can be suppressed to a marked degree by heating the rice at 185° C. or above for a short period of time.

An object of this invention is to provide a method for treating low-quality rice to make it suitable for use in saké brewing.

Other objects and advantages of this invention will become apparent from the following description.

According to this invention, there is provided a method for the quality improvement of low-quality rice for saké brewing, which comprises heating the low-quality rice for saké brewing such as low-grade rice, undermilled rice, old rice, or the like at a pressure of 3.0 kg/cm$^2$ or above and a temperature of 185° C. or above for one minute or less, preferably 2 to 10 seconds, and quickly discharging the heated rice into an atmosphere of ambient pressure.

According to this invention, the most important condition is to heat the rice at 185° C. or above under applied pressure. In conventional processes, the temperature of heating under applied pressure has been generally 130° to 150° C. or 180° C. at the highest. No precedent case is known, where the temperature of heating is 185° C. or above. When the rice is heated at 185° C. or above according to this invention, the elution of amino acids is suppressed, presumably because the proteins of rice undergo denaturation of some kind and becomes resistant to some degree against proteases. However, since a temperature of 185° C. or above is considerably high for heating rice, the time of heating should be one minute or less, preferably 2 to 10 seconds. If rice is heated for more than one minute, scorching or other degradations will take place, resulting in an undesirable decrease in the rate of utilization of rice.

The treatment according to this invention is adaptable to any kind of rice, except for the suitable rice for saké brewing, particularly to those rice varieties which are classified as low-grade rice from the standpoint of rice quality, to undermilled rice (including the rice for staple food) of a milling ratio as high as about 77% or above, which is higher than that of suitable rice for saké brewing, and to old rice. The untreated rice containing 9 to 25, preferably 10 to 20, % of moisture is used as such or after soaking in water. The low-quality rice for saké brewing is treated in a closed vessel such as, for example, a puffing equipment described in U.S. Pat. No. 3,754,930, in which the material is heated in a current of heating medium such as superheated steam. The treatment is performed at a pressure of 3.0 kg/cm$^2$ or above and a temperature of 185° C. or above, preferably at 3.0 to 6.0 kg/cm$^2$ and 190° to 240° C., for one minute or less, preferably 2 to 10 seconds. The heated rice is then quickly discharged into the atmosphere to yield a modified rice by heat puffing treatment.

The pressure used in the present method is 3.0 kg/cm$^2$ or above, preferably 3.0 to 6.0 kg/cm$^2$. If the pressure is below 3.0 kg/cm$^2$, the expansion of rice becomes unsatisfactory when discharged into an atmosphere of ambient pressure, whereas a pressure of above 6.0 kg/cm$^2$, for example 10.0 kg/cm$^2$ or above, is unnecessary, though the treatment can be performed under such a higher pressure. In practice, therefore, a pressure of 3.0 to 6.0 kg/cm² is sufficient. The heating temperature is 185° C. or above, preferably about 190° to about 240° C. If the temperature is below 185° C., the elution of amino acids becomes so increased that the treated rice becomes unsuitable for saké brewing, probably because of insufficient denaturation of the proteins. The duration of heating under pressure is one minute or less, preferably 2 to 10 seconds. With the increase in time of heating, the denaturation becomes promoted and if the rice is heated for more than one minute, undesirable scorching will take place. As the equipment for heating under pressure according to this invention, use may be made of either a conventional pressure kettle of the batch type or a continuous heat puffing unit of the pneumatic transport type.

The invention is illustrated in detail hereunder with reference to Experimental Examples and Examples, but the invention is not limited thereto.

EXPERIMENTAL EXAMPLE 1

Two hundred and forty kilograms of unmilled non-glutinous rice, grade 3, produced by "Reiho" strain of irrigated rice plant, in 1981, in Saga prefecture, was used as raw material. The raw material was milled to a milling ratio of 90, 80, or 75%, and each 60 kg was collected. The rice of the same milling ratio was divided into 3 groups to be treated under a pressure of 3.0, 4.0, and 6.0 kg/cm², respectively, each group weighing 20 kg. Each group was further divided into subgroups, weighing each 3 kg, to be treated at temperatures of 160°, 180°, 190°, 200°, and 210° C., respectively, or at temperatures of 160°, 180°, 190°, 210°, and 220° C., respectively. The rice of each subgroup was heated for 4 seconds in a superheated steam current at predetermined temperature and pressure as shown in Table 1. The heated rice was quickly discharged into the atmosphere to obtain puffed rice.

Each 10 g (in terms of white rice) of subgroups of puffed rice was placed in a 100-ml beaker. To each beaker, was added 50 ml of a 0.1-M succinate buffer (pH 4.3) containing Kokurase SS (Taka-Diastase containing saccharogenic α-amylase and protease; Sankyo Co.) in an amount corresponding to an α-amylase activity of 60 unit/ml, as determined by the standard analytical method of rice for saké brewing, recommended by the Study Group on Rice for Saké Brewing. The resulting mixture was left standing for 24 hours at 30° C. to effect saccharification of the sample rice. The saccharification mixture was filtered through Toyo filter paper No. 2. The filtrate was assayed for direct reducing sugar, amino acid content, and conversion (%) to α-starch to examine the effects of temperature and pressure of heating according to this invention. The control (0 kg/cm²) shown in Table 1 was the case in which the rice sample was soaked for 12 hours and then steamed for 30 minutes without applying pressure.

The conversion (%) to α-starch was determined in the following way: 0.5 g of the finely ground sample was accurately weighed out, then dispersed in 40 ml of water, admixed with 20 ml of 2-N acetate buffer (pH 4.8), and left standing at 37° C. To the mixture was then added 5 ml of an enzyme solution prepared by dissolving 0.6 g of an Endomyces, enzyme (saccharogenic amylase) (Matsurase M-00; Matsutani Kagaku Co.) in 250 ml of 0.008-M acetate buffer. The mixture was allowed to react for one hour and the reaction was terminated with 4 ml of 2-N sodium hydroxide solution. The reaction mixture was made up to 100 ml with water, filtered through Toyo filter paper No. 5A, and the filtrate was assayed for reducing sugar by the SOMOGYI method. The control experiment was run by accurately weighing out 0.5 g of the same sample, dispersing the sample in 40 ml of water, admixing with 5 ml of 2-N sodium hydroxide solution to effect complete conversion (100%) to α-starch, neutralizing the converted solution, allowing the neutralized solution to react with the same enzyme solution as used above, and assaying the reaction mixture for reducing sugar. The percentage conversion to α-starch was calculated by the following equation:

Conversion (%) to α-starch = (reducing sugar in sample) ÷ (reducing sugar in the control) × 100

The results obtained were as shown in Table 1.

TABLE 1

| | Condition of heating under pressure | | Assay | | | | | | Conversion to α-starch (%) | |
|---|---|---|---|---|---|---|---|---|---|---|
| | | | Direct reducing sugar (%)[1] | | | Amino acid content[1] | | | | |
| | Pressure (kg/cm²) | Temperature (°C.) | Milling ratio (%) | | | Milling ratio (%) | | | Milling ratio (%) | Evaluation |
| | | | 75 | 80 | 90 | 75 | 80 | 90 | 90–75 | |
| Heating under pressure for 4 seconds | 3 | 160 | 2.4 | 2.2 | 1.4 | 1.7 | 1.8 | 1.4 | 33–40 | Insufficient in conversion to α-starch, protein denaturation, and puffing ratio. |
| | | 180 | 5.6 | 5.4 | 5.0 | 3.6 | 3.9 | 4.3 | 75–80 | Insufficient in conversion to α-starch and puffing ratio. |
| | | 190 | 8.1 | 7.7 | 7.8 | 2.4 | 2.7 | 2.7 | 88–90 | Satisfactory in conversion to α-starch, protein denaturation, and puffing ratio. |
| | | 200 | 9.4 | 8.6 | 8.4 | 2.3 | 2.4 | 2.7 | 92–95 | Satisfactory in conversion to α-starch, protein denaturation, and puffing ratio. |
| | | 210 | 10.1 | 9.6 | 9.6 | 2.1 | 2.2 | 2.5 | 95< | Satisfactory in conversion to α-starch, protein denaturation, and puffing ratio. |
| | 4 | 160 | 3.6 | 3.6 | 3.2 | 1.91 | 1.9 | 1.5 | 65–75 | Insufficient in conversion to α-starch, protein denaturation, and puffing ratio. |
| | | 180 | 6.1 | 5.8 | 5.6 | 3.8 | 4.1 | 5.5 | 75–80 | Incomplete conversion to α-starch. |
| | | 190 | 11.0 | 10.6 | 9.6 | 2.0 | 2.4 | 2.6 | 90–92 | Satisfactory in conversion to α-starch, protein denaturation, and puffing ratio. |
| | | 200 | 11.8 | 11.0 | 11.4 | 2.0 | 2.4 | 2.6 | 95 | Satisfactory in conversion to α-starch, protein denaturation, and puffing ratio. |
| | | 210 | 12.1 | 12.2 | 11.8 | 1.8 | 2.0 | 2.3 | 95< | Satisfactory in conversion to α-starch, protein denaturation, and puffing ratio. |
| | 6 | 160 | 3.8 | 4.0 | 3.2 | 4.0 | 4.1 | 4.1 | 70–75 | Incomplete conversion to α-starch. |
| | | 180 | 7.4 | 7.4 | 6.8 | 3.8 | 4.3 | 5.8 | 80–85 | Somewhat insufficient in conversion to α-starch. |

TABLE 1-continued

| Condition of heating under pressure | | Assay | | | | | | | | |
|---|---|---|---|---|---|---|---|---|---|---|
| Pressure (kg/cm²) | Temperature (°C.) | Direct reducing sugar (%)*1 Milling ratio (%) | | | Amino acid content*1 Milling ratio (%) | | | Conversion to α-starch (%) Milling ratio (%) | Evaluation |
| | | 75 | 80 | 90 | 75 | 80 | 90 | 90-75 | |
| | 190 | 11.8 | 11.8 | 11.0 | 1.8 | 2.3 | 2.6 | 92-95 | Satisfactory in conversion to α-starch, protein denaturation, and puffing ratio. |
| | 210 | 12.8 | 12.0 | 12.2 | 1.6 | 2.0 | 2.3 | 95< | Sastisfactory in conversion to α-starch, protein denaturation, and puffing ratio. |
| | 220 | 11.8 | 13.0 | 11.6 | 1.5 | 1.8 | 2.1 | 95< | Satisfactory in conversion to α-strach, protein denaturation, and puffing ratio. |
| Control 0 | 100° C. 20 min. | 8.3 | 7.6 | 7.4 | 2.4 | 2.5 | 3.7 | — | — |

Note:
*1"Commentary to Standard Methods of Assay, National Tax Administration Agency, first enlarged and revised edition, March 15, 1973.

It is seen from the results of assay that when heated at 190° C. or above under a pressure of 3.0 kg/cm² or above, the sample rice showed sufficient conversion to α-starch and distinct suppression of the elution of amino acids caused by the enzymatic action upon proteins. It is also seen that as compared with rice heated by steaming without applying pressure, the rice sample of the same milling ratio, which was treated according to this invention, showed far less elution of amino acids and that even a rice sample of a milling ratio as high as 90% showed assay values permissible for the rice used in saké brewing.

EXPERIMENTAL EXAMPLE 2

Twenty kilograms of old rice (80% milling ratio) (variety: "Nihonbare"), harvested in 1980 in Saga prefecture, was heated for 4 seconds at 180°, 190°, or 210° C. under a pressure of 4.0 kg/cm² and quickly discharged into the atmospheric air to yield puffed rice. The filtrate obtained in a manner similar to that in Experimental Example 1 was assayed for specific gravity (in °Bé), amino acid content, crude fat and DMS precursor (DMSpre) which is believed to be a precursor of the old-rice odor.

The results obtained were as shown in Table 2. In Table 2, a rice sample heated at 100° C. for 30 minutes is a sample of customary steamed rice (without applied pressure) used as control. The values of DMSpre shown in Table 2 are those of untreated rice samples.

extract), amino acid content, and DMSpre content, said DMSpre being a precursor of the odor characteristic of old rice.

As described above in detail, according to this invention, low-grade rice, undermilled rice, and old rice, which have heretofore been considered to be unsuitable for saké brewing, can be converted to suitable rice for saké brewing; especially the use of undermilled rice in saké brewing results in an improvement in the rate of utilization of rice as raw material; and the elution of proteins and crude fats from low-grade rice varieties can be controlled. The present invention, therefore, is of an important significance from the industrial standpoint.

EXAMPLE 1

Two kilograms of undermilled rice (80% milling ratio, 13.2% moisture content, 7.7% proteins, and 0.23% crude fat) originated from "Reiho" variety of rice plant and harvested in 1981 in Saga prefecture, was treated for 5 seconds with superheated steam at 190° C. under a pressure of 4 kg/cm² in a continuous cooking vessel of the pneumatic transport type described in U.S. Pat. No. 3,754,930 and quickly discharged into the atmospheric air to yield 1,940 g of suitable rice for saké brewing which contained 4.3% of moisture.

EXAMPLE 2

Fifteen kilograms of low grade rice (75% milling

TABLE 2

| Temperature of heating at 4 kg/cm² (°C.) | Assay | | | | | | | | | | | |
|---|---|---|---|---|---|---|---|---|---|---|---|---|
| | Degree Baume*1 Milling ratio (%) | | | Amino acid content*2 Milling ratio (%) | | | Crude fat (%)*3 Milling ratio (%) | | | DMSpre (ppb)*4 Milling ratio (%) | | |
| | 75 | 80 | 90 | 75 | 80 | 90 | 75 | 80 | 90 | 75 | 80 | 90 |
| 180 | 4.3 | 4.1 | 4.0 | 3.0 | 4.4 | 5.2 | 0.013 | 0.018 | 0.021 | 60 | 62 | 96 |
| 190 | 7.1 | 6.9 | 6.6 | 1.6 | 2.3 | 3.0 | 0.008 | 0.012 | 0.015 | 31 | 55 | 80 |
| 210 | 7.9 | 7.8 | 7.6 | 1.4 | 2.0 | 2.6 | 0.007 | 0.009 | 0.013 | 33 | 52 | 77 |
| 100° C. 30 min. | 7.2 | 6.9 | 6.8 | 2.8 | 3.2 | 4.4 | 0.018 | 0.024 | 0.029 | 40 | 53 | 86 |
| Untreated rice | — | — | — | — | — | — | 0.226 | 0.315 | 0.370 | 6070 | 6500 | 1006 |

Note:
*1Determined by means of a Baumes hydrometer.
*2Same to "Note: *1" of Table 1.
*3Determined by the method described in "Chomi Kagaku" (Seasoning Science). Vol. 18, No. 11, p. 30-35, 1971.
*4Determined by the method described in "Nippon Jozokyokai Zasshi" (Journal of the Brewing Society of Japan). Vol. 74, No. 10, p. 667-682, 1979; ibid., Vol. 74, No. 12, p. 829-832, 1979.

As is apparent from the results of assay, when heated under pressure at a temperature of 190° C. or above, even the old rice sample showed a higher specific gravity (°Bé) and a marked decrease in crude fat (ether ratio, 12.9% moisture content, 7.9% proteins, and 0.2% crude fat) originated from "Tomoyukata" variety of rice plant and harvested in 1980 in Hokkaido was heated for 4 seconds in a batch-type closed pressure vessel at 210° C. and a pressure of 3.5 kg/cm², and quickly discharged into the atmospheric air to yield 13.8 kg of suitable rice for saké brewing. The changes in constituents caused by the heating under applied pressure and subsequent puffing were as shown in Table 3. The assay for the constituents was performed in the same manner as in Example 1. The rice used as control was the same one used above, which was soaked for 12 hours, drained for 2 hours, and cooked for 30 minutes by steaming at 100° C. without applying pressure.

TABLE 3

|  | Present invention | Control |
| --- | --- | --- |
| Amino acid content | 1.8 | 2.3 |
| Crude fat, % | 0.071 | 0.175 |

EXAMPLE 3

"Reiho" rice harvested in 1981 in Saga prefecture was milled to a milling ratio of 90% to yield 15 kg of undermilled rice which contained 13.4% of moisture, 8.9% of proteins, and 0.74% of crude fat. The undermilled rice was heated for 5 seconds at 210° C. under a pressure of 4.0 kg/cm² in the same continuous cooking vessel of the pneumatic transport type as used in Example 1 and quickly discharged into the atmospheric air to yield suitable rice for saké brewing, which contained 4.8% of moisture.

EXAMPLE 4

Sixty kilograms of old rice (75% milling ratio, 13.1% moisture content, 6.7% proteins, and 0.15% crude fat) originated from "Nihonbare" variety of rice plant, harvested in 1980 in Shiga prefecture, was heated for 4 seconds at 210° C. under a pressure of 6.0 kg/cm² in the same continuous cooking vessel of the pneumatic transport type as used in Example 1 and quickly discharged into the atmospheric air to yield 55.0 kg of puffed rice containing 3.8% of moisture. As shown in Table 4, the puffed rice contained markedly reduced amounts of crude fat and DMSpre and can be used satisfactorily in saké brewing.

TABLE 4

|  | Present invention | Control (untreated rice) |
| --- | --- | --- |
| Crude fat | 0.09 (%) | 0.16 (%) |
| DMSpre | 988 (ppb) | 1900 (ppb) |

APPLICATION EXAMPLE

Two hundred milligrams of koji-mold spore (7.0 g) of "Ace Higuchi", Trademark for Higuchi Moyashi Co.) was scattered over 20 kg (in terms of untreated rice) of the puffed rice obtained in Example 1, and thoroughly mixed. Water at 30° C. was then sprayed uniformly over the puffed rice so that the water content may become 36%. After about one hour of standing and swelling, the koji making was started in a customary manner and finished after 37 hours to yield 24 kg of koji for the first addition to mash.

Saké mashing was performed in accordance with the mash bill shown in Table 5, using the above koji and the same puffed rice as that obtained in Example 1.

TABLE 5

| | Mash Bill | | |
| --- | --- | --- | --- |
|  | First addition | Last addition | Total |
| Total rice (kg) | 80 | 220 | 300 |
| Puffed rice (kg) | 60 | 197 | 257 |
| Puffed rice for koji making (kg) | 20 | 23 | 43 |
| Mashing water (liter) | 120 | 300 | 420 |

The koji for the last addition was prepared in the same manner as in the preparation of the koji for the first addition to mash, using 23 kg (in terms of untreated rice) of puffed rice.

Brewing was carried out in a customary manner and 630 liters of saké were obtained. A detailed description is given hereunder.

Into a fermentation tank, were charged 24 kg of the koji for the first addition ("rice for koji making") and 120 liters of water charge ("mashing water"). To the tank, was added 150 g of the yeast prepared from a cultured yeast solution by centrifuging. After thorough mixing, the mixture was stationary-cultured for 24 hours at a liquor temperature of 15° C. To the cultured mixture, was added 60 kg (in terms of untreated rice) of puffed rice to complete the first addition which was further subjected to stationary culture for 48 hours at 15° C. To the resulting mash, were added 23 kg (in terms of untreated rice) of the koji for the last addition ("Koji"), 300 liters of water charge (mashing water), and 197 kg (in terms of untreated rice) of the puffed rice. While being gently stirred, the resulting mixture was allowed to cool down to 9° C. to complete the last addition and to complete the mashing operation. The mash was further stationary-cultured. The temperature of mash was allowed to rise at a rate of 1° C. per day and reached 15° C. on the 6th day. The mash temperature was maintained at this temperature until fermented mash was obtained on the 14th day after completion of mashing. The fermented mash was pressed to yield 630 liters of saké.

For comparison, the same old crop rice as that used in preparing the puffed rice was used as control (1) and a sample of new crop rice was used as control (2). Koji and steamed rice were prepared from these control samples by following a customary saké brewing procedure and saké was brewed in accordance with the mash bill shown in Table 5. The results of assay on the saké samples were as shown in Table 6.

TABLE 6

| Item of test | Present invention | Control (1) | Control (2) |
| --- | --- | --- | --- |
| Alcohol content | 19.5 | 17.6 | 18.0 |
| Amino acid content | 1.4 | 2.1 | 2.0 |
| Total nitrogen (mg/100 ml) | 82 | 110 | 105 |
| Isoamyl acetate (ppm) | 6.3 | 3.8 | 4.1 |
| Yield of alcohol (ml/kg milled rice) | 390 | 354 | 365 |

In general, when the crude fat content of the rice used as raw material is high, the formation of isoamyl acetate necessary for the aroma of saké is hindered. An advantage of the present invention is evidenced by the higher isoamyl acetate content of saké owing to a reduced crude fat content of the puffed rice produced by the present method. In fact, the saké obtained as described above had a good aroma.

The saké thus obtained was refined in a customary manner by pasteurization, sedimentation, and filtration. The alcohol content was adjusted by the addition of water to 16.0% and used as the sample for organoleptic test. The saké obtained according to this invention and two kinds of saké similarly produced from rice used as controls (1) and (2) were evaluated by a panel of 15 skilled members. All of them concluded that the saké obtained from the puffed rice of this invention was superior in both aroma and taste to those obtained from controls (1) and (2). Further, according to the present invention, there is obtained saké which is higher in an alcohol content, isoamyl acetate content and an yield of alcohol and lower in an amino acid content as well as a total nitrogen than saké produced by a customary saké brewing procedure using new crop rice {control (2)}, that is, saké excellent in quality containing scarecely unpleasing taste components can be obtained.

What is claimed is:

1. In a method for brewing sake in which koji, water, yeast and rice are combined as a mash and fermented and sake is recovered from fermented mash the improvement which comprises using a puffed rice as a starting material obtained by heat-treating at least one member selected from the group consisting of low-grade rice, broken rice, small-kernel hard rice, under-milled rice and old crop rice at a pressure of $3.0 \text{ kg/cm}^2$ or above and a temperature of 185° C. or above for one minute or less, and quickly discharging the treated rice into an atmosphere of ambient pressure.

2. A method according to claim 1, wherein the heat treatment is performed at a pressure of 3.0 to 6.0 $\text{kg/cm}^2$ and a temperature of 190° to 240° C. for a duration of 2 to 10 seconds.

* * * * *